United States Patent
Nagy et al.

(10) Patent No.: US 11,455,223 B2
(45) Date of Patent: Sep. 27, 2022

(54) USING SYSTEM ERRORS AND MANUFACTURER DEFECTS IN SYSTEM COMPONENTS CAUSING THE SYSTEM ERRORS TO DETERMINE A QUALITY ASSESSMENT VALUE FOR THE COMPONENTS

(71) Applicant: International Business Machines Corporation, Armonk, NY (US)

(72) Inventors: Alexandru Nagy, Gilroy, CA (US); Kellie Arciszewski, San Jose, CA (US); Jimmy Y. Wong, Saratoga, CA (US); Dean W. Stuenkel, Gilroy, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 595 days.

(21) Appl. No.: 16/158,253

(22) Filed: Oct. 11, 2018

(65) Prior Publication Data
US 2020/0117561 A1 Apr. 16, 2020

(51) Int. Cl.
G06F 11/22 (2006.01)
G06F 11/07 (2006.01)

(52) U.S. Cl.
CPC ........ *G06F 11/2273* (2013.01); *G06F 11/079* (2013.01); *G06F 11/0766* (2013.01)

(58) Field of Classification Search
CPC .............. G06F 11/0766; G06F 11/079; G06F 11/0778; G06F 11/2273; G06F 11/0775;
(Continued)

(56) References Cited

U.S. PATENT DOCUMENTS 9,621,421 B1 * 4/2017 Tolentino ................ H04L 43/16
10,810,073 B2 * 10/2020 Vasileva ............. G06F 11/0736
(Continued)

FOREIGN PATENT DOCUMENTS

WO WO2012127818 A1 7/2014

OTHER PUBLICATIONS

Magoosh Statistics Blog, "Weighted Average: How to find It and When to Use it", Jan. 26, 2018, magoosh.com/statistics/weighted-average-find-use/ (Year: 2018).*
(Continued)

*Primary Examiner* — Tarun Sinha
*Assistant Examiner* — Yossef Korang-Beheshti
(74) *Attorney, Agent, or Firm* — Konrad Raynes Davda & Victor LLP; David W. Victor

(57) ABSTRACT

Provided are a computer program product, system, and method for using system errors and manufacturer defects in system components causing the system errors to determine a quality assessment value for the components. A system error message indicates at least one at least one system error resulting from an operation of at least one component deployed in the system. A manufacturing defect for the at least one component whose operation results in the at least one system error is determined from information from a manufacturer of the component. A quality assessment value is determined from the system error and manufacturing defect, for each of the at least one component for which there is a manufacturing defect. A message is transmitted to an administrator of the system indicating a negative assessment of the component in response to a comparison of the quality assessment value and a threshold value indicate a negative assessment.

18 Claims, 6 Drawing Sheets

(58) Field of Classification Search
CPC . G06F 11/0793; G06F 2201/81; G06F 11/008
See application file for complete search history.

(56) References Cited

U.S. PATENT DOCUMENTS

| | | |
|---|---|---|
| 2005/0210161 A1 | 9/2005 | Guignard et al. |
| 2011/0022641 A1 | 1/2011 | Werth et al. |
| 2013/0185108 A1 | 7/2013 | Bainbridge et al. |
| 2013/0268327 A1 | 10/2013 | Nagamatsu et al. |
| 2015/0205711 A1* | 7/2015 | Dhangar ............. G06F 11/0709 714/38.1 |
| 2018/0173212 A1* | 6/2018 | Poh .................... G05B 23/0235 |
| 2020/0278273 A9* | 9/2020 | Shapiro ............. G05B 23/0275 |

OTHER PUBLICATIONS

Anderson, Alan, "How to find the weighted arithmetic mean of a data set", Dec. 17, 2014, www.dummies.com/education/math/business-statistics/how-to-find-the-weighted-arithmetic-mean-of-a-data-set/ (Year: 2014).*

Ayyash, M. et al., "Preemptive Quality of Service Infrastructure for Wireless Mobile Ad Hoc Networks", IWCMC'06, Jul. 2006, Vancouver, British Columbia, Canada, Copyright 2006 ACM, Total 6 pp.

Chakraborty, S. et al., "Real Time Statistical Process Advisor for Effective Quality Control", Decision Support Systems 42 (2006) 700-711, Department of Production Engineering, Jadavpur University, Kolkata, 700 032, India, Cognizant Technology Solutions, Salt Lake, Kolkata, 700 091, India. received in revised form Mar. 3, 2005; accepted Mar. 5, 2005, available online Jul. 1, 2005, © 2006 Published by Elsevier B.V., Total 12 pp.

\* cited by examiner

USING SYSTEM ERRORS AND MANUFACTURER DEFECTS IN SYSTEM COMPONENTS CAUSING THE SYSTEM ERRORS TO DETERMINE A QUALITY ASSESSMENT VALUE FOR THE COMPONENTS

BACKGROUND OF THE INVENTION

1. Field of the Invention

The present invention relates to a computer program product, system, and method for using system errors and manufacturer defects in system components causing the system errors to determine a quality assessment value for the components.

2. Description of the Related Art

One challenge for computer system administrators and owners is to monitor the quality and health of components deployed in the system, such as storage devices, network adaptors, display adaptors, etc. during their use in the system. In the current art, if the system administrator or owner notices problems, they may contact the manufacturer and provide serial numbers of the components to determine if there are any recognized defects to determine whether to replace the components. However, in systems having numerous components, such as servers in large server farms, administrators may have difficulty keeping track of problems with numerous deployed components, such as thousands of storage devices.

There is a need in the art for improved techniques for assessing the operability of deployed components in computer systems and other machines.

SUMMARY

Provided are a computer program product, system, and method for using system errors and manufacturer defects in system components causing the system errors to determine a quality assessment value for the components. Information is gathered from the system on at least one system error message indicating at least one at least one system error resulting from an operation of at least one component deployed in the system. A determination is made, from information from a manufacturer of the at least one component, of a manufacturing defect for the at least one component whose operation results in the at least one system error. A quality assessment value is determined from the at least one system error and a manufacturing defect, for each of the at least one component for which there is a manufacturing defect. A higher quality assessment value indicates a greater likelihood that the component is likely to fail than a lower quality assessment value. A determination is made as to whether a comparison of the quality assessment value and a threshold value indicates a negative assessment of the component. A message is transmitted to an administrator of the system indicating the negative assessment of the component in response to determining that the quality assessment value and the threshold value indicate the negative assessment.

DETAILED DESCRIPTION

Administrators of systems having numerous components may have difficulty ascertaining the health and quality of deployed components, which may require contacting the manufacturer to determine any known defects that could be causing problems in the system. Described embodiments provide improvements in computer technology for assessing the health and quality of components deployed in a system by processing information gathered from the system in system error messages indicating system errors resulting from an operation of components deployed in the system. A determination is made from information from a manufacturer of the components producing the system errors of manufacturing defects for the components. The determined manufacturing defects and system errors are processed to determine a quality assessment value indicating a likelihood the components will fail or continue to degrade performance. This quality assessment value is compared to a threshold value to determine whether to provide a negative assessment of the components. If there is a negative assessment of the components, a message is transmitted to an administrator of the system indicating the negative assessment of the component. The system administrator may use this information to determine to replace the components that are producing the system errors.

Described embodiments provide improvements to computer technology for assessing the quality and operability of components deployed in a system by using databases having current information on system errors from the system and manufacturing defects of the components to determine a quality assessment value based on the specific system errors and components causing those errors, and a number of the system errors and components. This quality assessment value may then be used to determine whether to recommend a negative or non-negative assessment of the components that can be used to consider whether to replace the components upon receiving a negative assessment.

Figure 1:
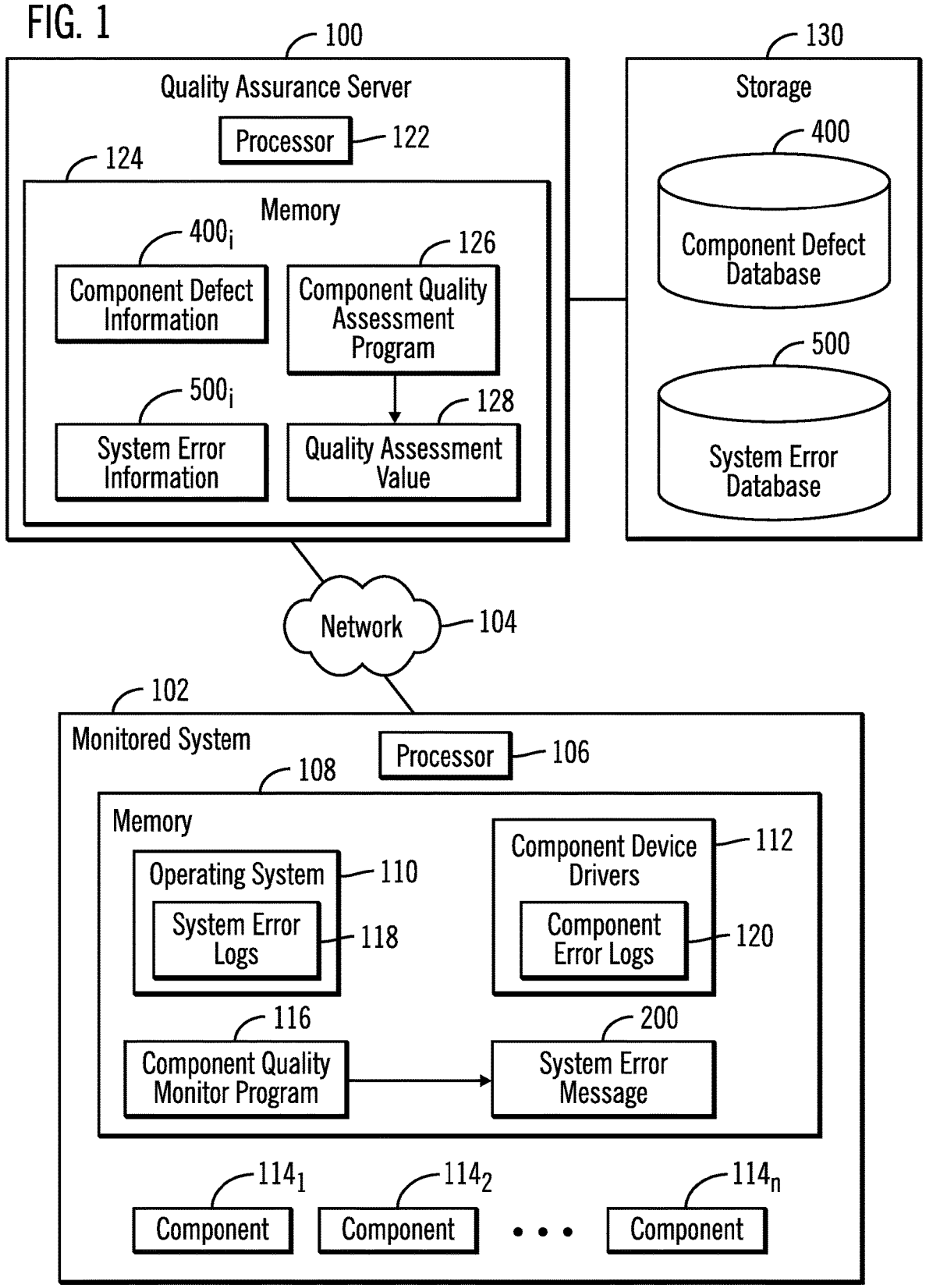
FIG. 1 illustrates an embodiment of a computing environment.

FIG. 1 illustrates a computing environment having a quality assurance server 100 that communicates with one or more monitored systems 102 over a network 104. The monitored system 102 includes a processor 106 and a memory 108 including program components executed by the processor 106, including an operating system 110 and component device drivers 112 to control operations of one or more deployed components $114_1, 114_2 \ldots 114_n$, and a component quality manager program 116. The deployed components $114_1, 114_2 \ldots 114_n$ may comprise hardware components such as storage devices, memory devices, network adaptors, bus cards, such as Peripheral Component Interface Express (PCIe) cards, microprocessors, display adaptors, Redundant Array of Independent Disks (RAID) controllers, etc., and/or software components, e.g., application programs, database programs, etc.

The operating system 110 maintains system error logs 118 to log various system errors, including errors resulting from component $114_1, 114_2 \ldots 114_n$, operations, such as device errors, operating system errors, and remote access connection (RAS) errors, etc. The component device drivers 112 include component error logs 120 to log errors related to component operations. System errors may comprise errors in both the logs 118 and 120. A component quality manager 116 determines system errors in the logs 118, 120 and generates a system error message 200 having information on the determined errors and components $114_1, 114_2 \ldots 114_n$ whose operations resulted in the system errors.

The quality assurance server 100 includes a processor 122 and a memory 124 including a component quality assessment program 126 that processes the system error message 200 from the monitored system 102 to determine whether to indicate a negative assessment of one or more of the components $114_1, 114_2 \ldots 114_n$ whose operations generate errors indicated in the system error message 200. A negative assessment indicates the components $114_1, 114_2 \ldots 114_n$ that are producing the system errors should be replaced because they may become inoperable or sufficiently degrade performance to unacceptable levels. The component quality assessment program 126 accesses component defect information $400_i$ from a component defect database 400 in a storage 130 having information on component defects and system error information $500_i$ from a system error database 500 for system errors indicated in the system error message 200 to generate a quality assessment value 128 indicating a likelihood the components are sufficiently degraded they should be replaced.

The arrows shown in FIG. 1 illustrate a flow of data.

The network 104 may comprise a Storage Area Network (SAN), Wide Area Network (WAN), Local Area Network (LAN), the Internet, and Intranet, a wireless network, wired network, etc. Additionally, the servers 100, 102 may communicate over another interface, such as a bus or other network, including a Peripheral Component Interconnect Express (PCIe) bus.

The operating system 110, component device drivers 112, component quality monitor program 116, and component quality assessment program 126 are shown in FIG. 1 as program code loaded into the memories 108, 124 and executed by the processors 106, 122. Alternatively, some or all of the functions may be implemented in hardware devices, such as in Application Specific Integrated Circuits (ASICs) or executed by separate dedicated processors.

The storage 130 may comprise a suitable non-volatile storage device known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc.

The memory 108 may comprise suitable volatile or non-volatile memory devices.

Figure 2:
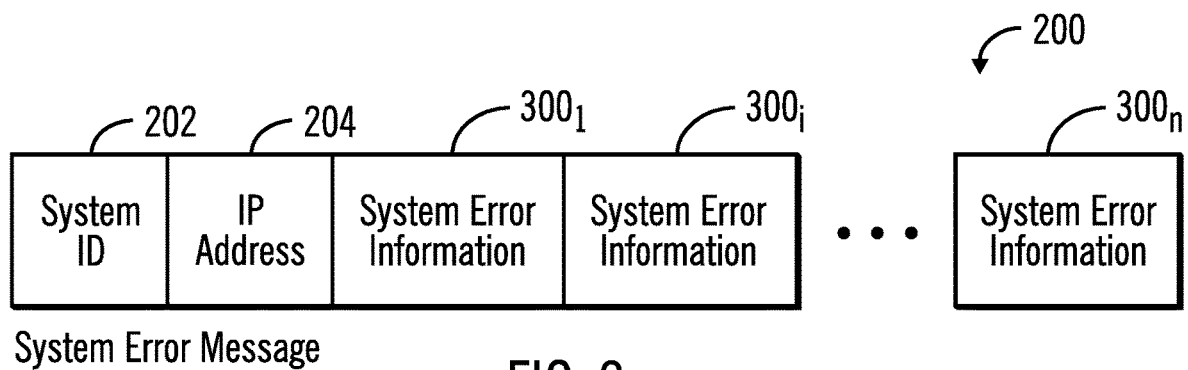
FIG. 2 illustrates an embodiment of a system error message.

FIG. 2 illustrates an embodiment of a system error message generated by the component quality monitor program 116, and includes: a system identifier (ID) identifying the monitored system 202; a network (IP) address 204 of the monitored system 202; and system error information $300_1, 300_i \ldots 300_n$ for each determined system error from the error logs 118, 120.

Figure 3:
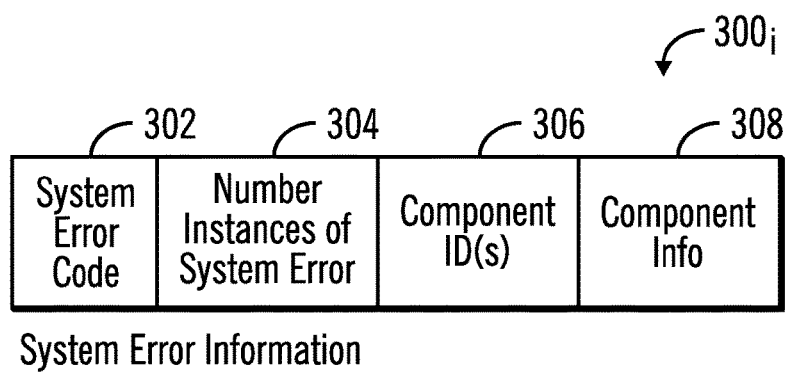
FIG. 3 illustrates an embodiment of system error information included in the system error message for a system error.

FIG. 3 illustrates an embodiment of an instance of system error information $300_i$ including a system error code 302 of the system error; a number of instances of the system error 302; component IDs 306 of components producing the system error code 302, such as a manufacturer provided unique serial number; and component information 308 on each component.

Figure 4:
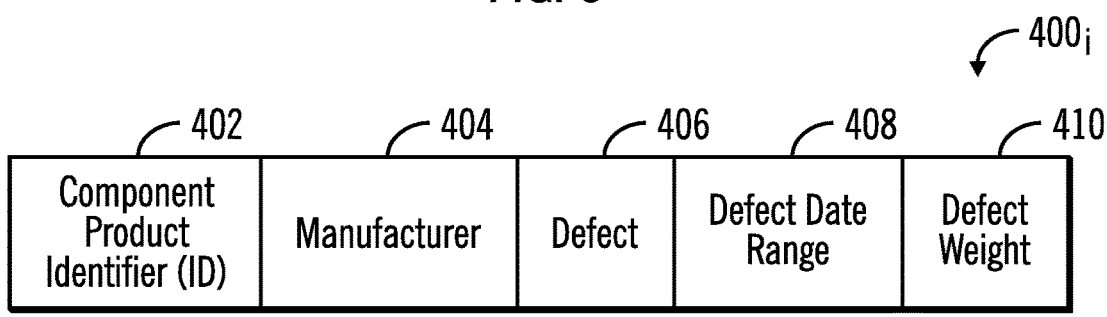
FIG. 4 illustrates an embodiment of an instance of component defect information in a component defect database.

FIG. 4 illustrates an embodiment of an instance of component defect information $400_i$ for a component in the component defect database 400 including: component product identifier (ID) identifying a specific component product, e.g., product name and model number; a manufacturer 404; a defect 406, such as a specific defect code; defect date range 408 indicating a date range during which the component product 402 was manufactured with the defect 406; and a defect weight 410 indicating a severity of the defect or likelihood the defect will result in inoperability or unacceptable performance degradation, where a higher defect weight 410 indicates a higher severity of the defect or higher likelihood of inoperability or reduced performance, and a lower weight 410 value indicates a lower likelihood the defect 4016 will result in loss of operability or reduced performance of the component 402.

The component defect information $400_i$ may be updated with information from the manufacturer of the components, including any newly detected defects 406, defect date ranges 408 and defect weights 410 of the defects. Alternatively, the defect weights 410 may be added by the provider of the component quality assessment program 126 based on testing and observation. In this way, the component defect database 400 may maintain updated and current information on known defects and their defect weights indicating the impact of the defect on the operability and performance of the components. Further, the component quality assessment program 126 may contact a service to update the component defect database 400 to include information on components indicated in system error messages 200 from monitored systems 102.

Figure 5:
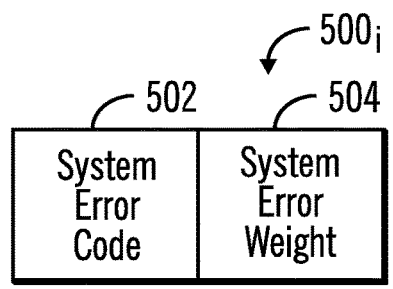
FIG. 5 illustrates an embodiment of an instance of system error information in a system error database.

FIG. 5 illustrates an embodiment of an instance of system error information $500_i$ in the system error database 500 for a system error code indicating a system error code 502 and a system error weight 504 to apply for the system error code 502, where a higher system error weight 504 indicates a higher severity of the system error defect or higher likelihood of loss of operability or reduced performance, and a lower system error weight 504 indicates a lower likelihood the system error 502 will result in loss of operability or reduced performance of the component 402.

The system error information $500_i$ may be continually updated by the provider of the component quality assessment program 126 based on testing and observation for components that are being monitored by the component quality assessment program 126. The component quality assessment program 126 may contact a service to update the system error database 500 to include information on system error codes in system error messages 200 from monitored systems 102.

Figure 6:
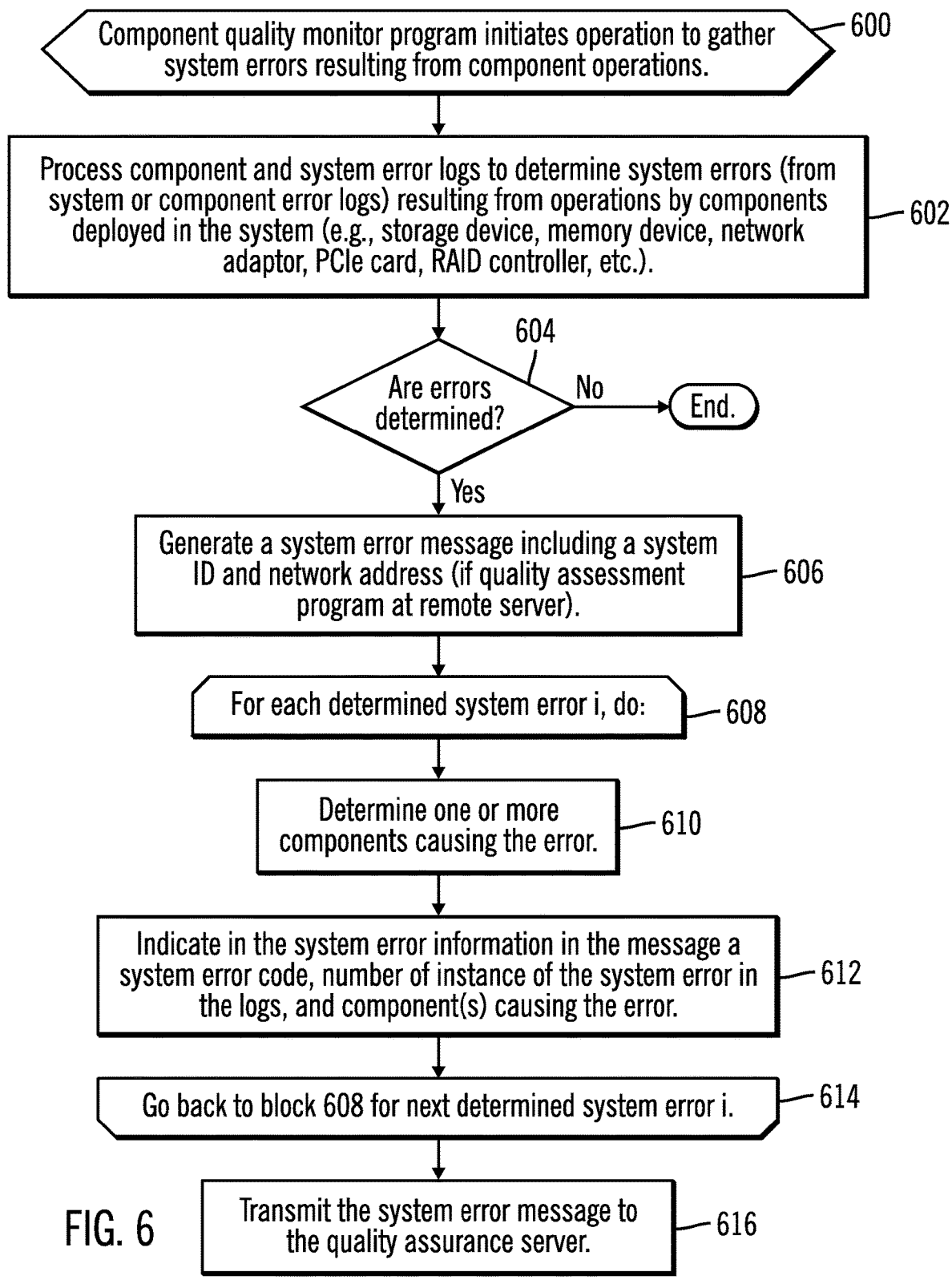
FIG. 6 illustrates an embodiment of operations to generate a system error message having information on system errors and components causing the system errors in a monitored system.

FIG. 6 illustrates an embodiment of operations performed by the component quality monitor program 116 to gather system errors from resulting component $114_1$, $114_2$ ... $114_n$ operations. In one embodiment, the component quality monitor program 116 may periodically initiate the operations of FIG. 6 or initiate the operations in response to an event, such as detecting a threshold number of system errors in the error logs 118, 120. Upon initiating (at block 600) operations to gather system error information, the component quality monitor program 116 processes (at block 602) the component 120 and system 118 error logs to determine system errors (from system or component error logs) resulting from operations by components $114_1$, $114_2$ ... $114_n$ deployed in the system 102 (e.g., storage device, memory device, network adaptor, PCIe card, RAID controller, etc.), If (at block 604) there are determined system errors, then the component quality monitor program 116 generates (at block 606) a system error message 200 including a system ID 202 and network address 204 (if the component quality assessment program 126 is located in a remote system 100). For each determined system error i, the component quality monitor program 116 performs a loop of operations from blocks 608 through 614. At block 610, one or more components $114_i$ are determined that cause the system error i, such as from the information in the error logs 118, 120. The component quality monitor program 116 indicates (at block 612) in an instance of system error information $300_i$ in the system error message 200 a system error code 302 of the system error i, a number of instances 304 of the system error i in the error logs 118, 120, component IDs 306 of one or more components $114_i$ that cause the system error code 302, as indicated in the error logs 118, 120, and component information 308, such as performance information, number hours operational, starting operation date, etc. If (at block 604) no errors are determined from the error logs 118, 120, then control ends.

After generating system error information $300_i$ in the system error message 200 for each system error code detected in the logs 118, 120, the component quality monitor program 116 transmits (at block 616) the generated system error message 200 to the quality assurance server 100 to determine a quality assessment value 128 based on the system errors and any defects in the components causing the system errors.

In the embodiment of FIG. 6, the monitored system 102 and quality assurance server 100 communicate over a network 104. In an alternative embodiment, the component quality monitor program 116 and component quality assessment program 126 may execute in the same system 102. In such case, the system error message 200 may be transmitted between the programs 126 and 116 executing in a same memory or different memories of the same system.

In the embodiment of FIG. 1, the quality assurance server 100 may generate quality assessment values 128 for multiple monitored systems 102 to assess quality for multiple monitored systems, such as part of a cloud based service.

In the embodiment of FIG. 6, the component quality monitor program 116 gathers system error information from the error logs 118, 120 and provides information on the components $114_1$, $114_2$ ... $114_n$ causing the system errors whose quality needs to be assessed to determine whether they should be replaced.

Figure 7:
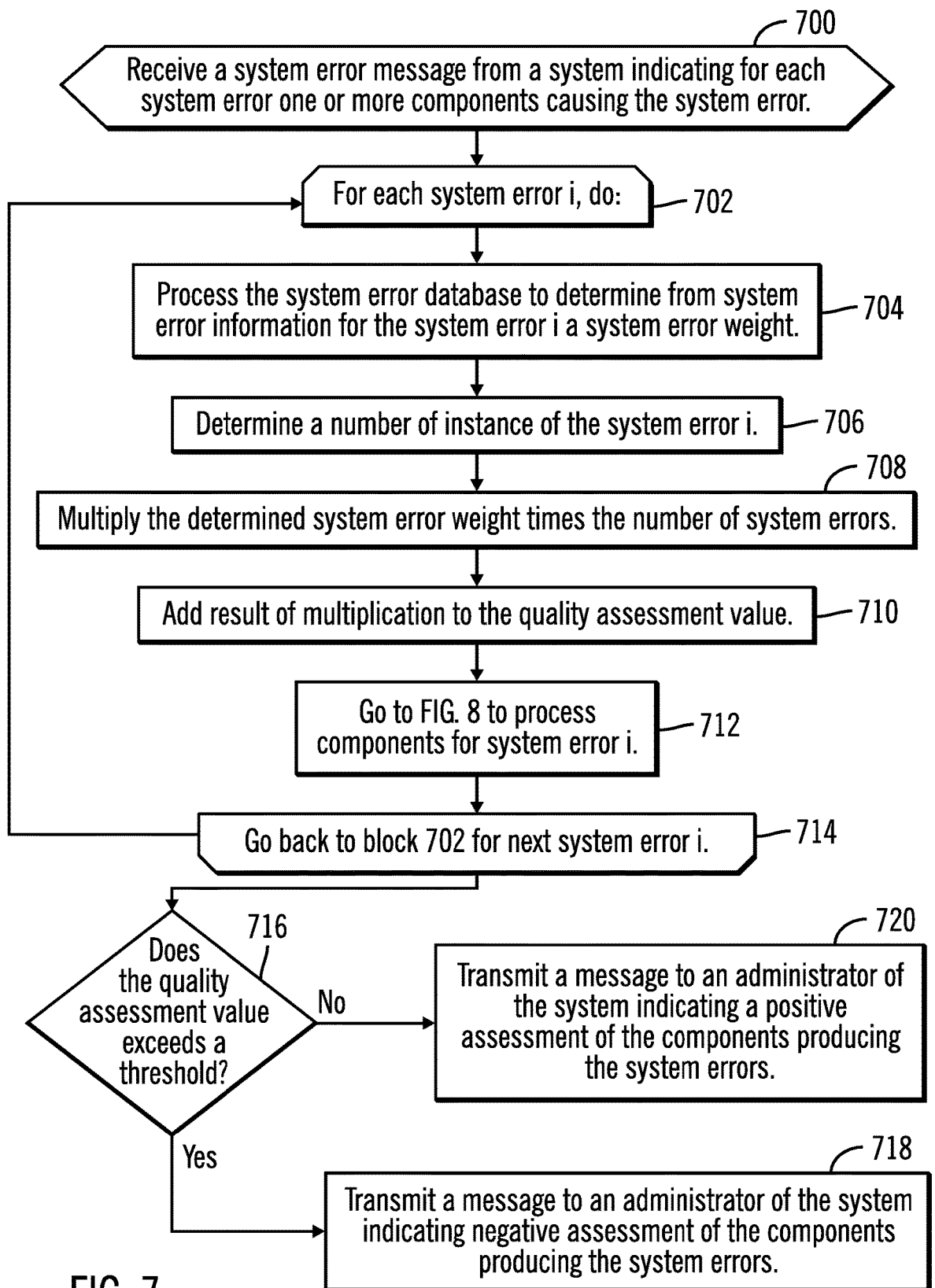
FIG. 7 illustrates an embodiment of operations to determine a quality assessment value and assessment of the components indicated in an error message.

FIG. 7 illustrates an embodiment of operations performed by the component quality assessment program 126 to determine a quality assessment value 128 from a system error message 200. Upon receiving (at block 700) a system error message 200 from a monitored system 102, the component quality assessment program 126 performs a loop of operations at blocks 702 through 714 for each system error or instance of system error information $300_i$ in the message 200. At block 704, the system error database 500 is processed to determine from system error information $500_i$ for the system error i 502 a system error weight 504. A number of instances of the system error i 304 is determined from the error message 200 (at block 706) and multiplied (at block 708) by the system error weight 504 to determine a system error weighted value that is added (at block 710) to the quality assessment value 128. Control then proceeds to FIG. 8 to process the components 306 indicated in the system error information $300i$ being processed to add their weights to the quality assessment value 128.

Figure 8:
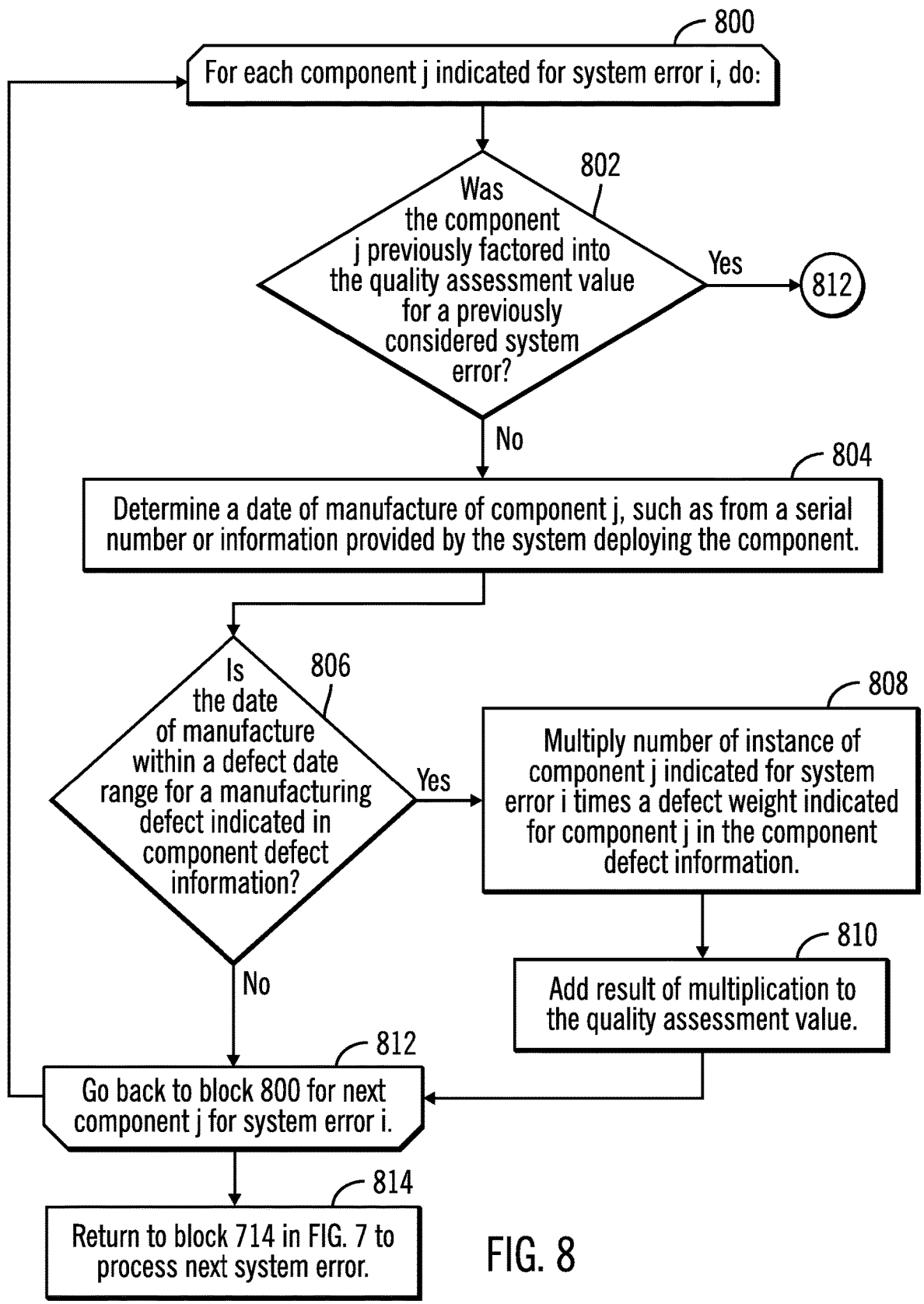
FIG. 8 illustrates an embodiment of operations to determine defect weights for components indicated in the system error message as producing system errors to add to the quality assessment value for the components in the system.

With respect to FIG. 8, the component quality assessment program 126 performs a loop of operations at blocks 800 to 812 for each component j indicated in the components 306 of the system error information $300_i$ being processed. If (at block 802) the component j was previously factored into the quality assessment value 128 for the current error message 200 being processed, then control proceeds to block 812 to consider a next component indicated in the components 306. In this way, a manufacturing defect for a single component whose operations results in at least two of the system errors is only considered once in the quality assessment value. In alternative embodiments, a component may be considered multiple times into the quality assessment value for all reported system errors. If (at block 802) the component j was not previously factored into the quality assessment value 128, then the component quality assessment program 136 determines (at bock 804) a date of manufacture of component j, such as from a serial number comprising the component ID 306 or information provided by the system 102 deploying the component. The manufacture server may be queried to determine the date of manufacture for a serial number.

If (at block 806) the date of manufacture is within a defect date range 408 for a defect 406 indicated in component defect information $400_j$ for the component j product ID 402, then the component j has the defect and a number of instances of component j, i.e., a number of instances of component 306 in the system error information $300_i$ having the same component product ID 402, is multiplied (at block 808) by a defect weight 410 indicated for component j in the component defect information $400_j$ for component j, i.e., for the component product ID 402 of component j. The result of the multiplication is added (at block 810) to the quality assessment value 128 to include the impact of the defective component j. If (at block 806) the date of manufacture of component j is not within the defect date range 408 for the component product ID 402 in the component defect information $400_j$ of component j or after adding the weighted defect value (at block 810) to the quality assessment value 128, control proceeds to block 812 to consider a next component j in the component IDs 306 for the system error information $300_i$ for system error i being considered until all components indicated in the component IDs 306 for system error information $300_i$ instance are considered. After considering all components for a system error i in system error information $300_i$ control returns (at block 814) to block 714 in FIG. 7 to process a next system error i until all the system errors or system error information instances $300_1$, $300_2$ ... $300_n$ in the system error message 200 are processed With respect to FIG. 7, after processing all the system errors indicated in the system error information $300_1$ ... $300_n$ in the system error message 200, then if (at block 716) the final cumulative quality assessment value 128 exceeds a predetermined threshold, then the component quality assessment program 126 transmits (at block 718) a message to the monitored system 102 indicating a negative assessment of the components producing the system errors indicated in the system error message 200. An administrator of the monitored system 102 may then decide based on the negative assessment, indicating a likelihood of future failure or degraded performance at the components 306, to replace certain of the components 306 indicated in the system error message 200. If (at block 716) the quality assessment value 128 does not exceed the threshold, then a message is transmitted (at block 720) to the monitored system 102 indicating a positive (or non-negative) assessment of the components 306 producing the system errors indicated in the system error message 200. The administrator of the monitored system 102 may decide not to replace the components 306 upon receiving a message indicating a positive or non-negative assessment, which indicates a lower likelihood of future failure or degraded performance at the components 306 indicated in the system error message 200 producing the system errors.

The embodiments of FIGS. 7 and 8 provide improved computer technology for determining a likelihood of system errors resulting from components deployed in the system and components that should be replaced. With the described embodiments, a component defect database 400 and system error database 500 provides current information on known manufacturing defects in components and system errors and associated weights related to the seriousness of the errors and defects. With described embodiments, the monitored system 102 gathers information on system errors and components resulting in the system errors and sends to the quality assurance server 100 to apply the weights for the system errors and defects maintained current in the databases 400 and 500 to generate a quality assessment value 128 used to determine a likelihood the components should be replaced due to likely future failure or continued degradation in performance.

In further embodiments, the quality assurance server 100 may comprise a cloud service that provides quality assessments for components from different subscribing systems 102 for a fee.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
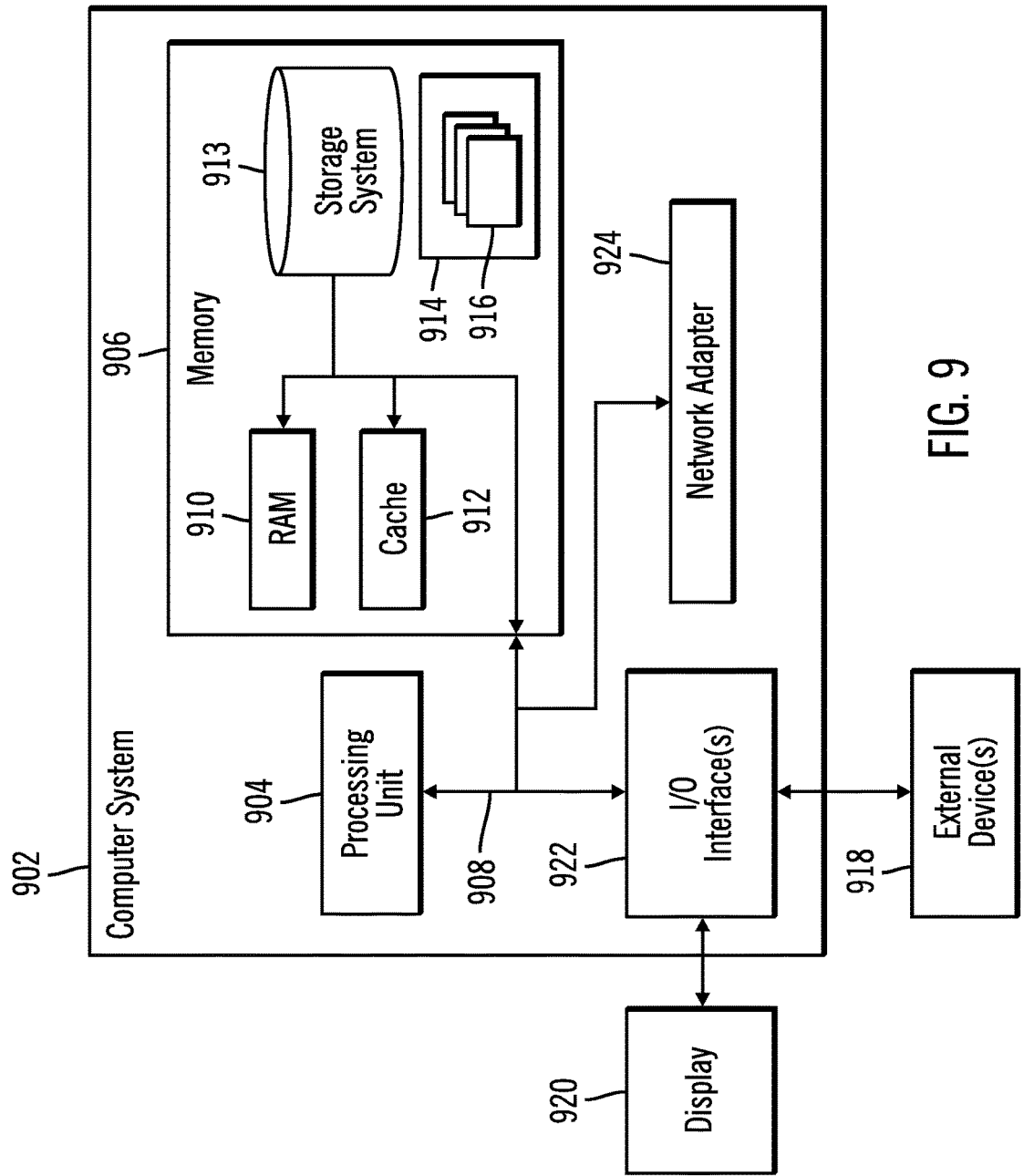
FIG. 9 illustrates an embodiment of a computer architecture used with described embodiments.

The computational components of FIG. 1, including the servers 100 and 102, may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for providing health status of components in a system, the computer program product comprising a computer readable storage medium having computer readable program code embodied therein that is executable to perform operations, the operations comprising:

receiving a system error message including a system error code for a system error and a number of instances of the system error;

processing the system error code and the number of instances of the system error to determine a system error weight indicating a likelihood a system error will result in inoperability of at least one component deployed in the system, wherein the system error weight indicates one of a plurality of values, wherein a higher system error weight indicates a higher likelihood the system error will result in loss of operability and a lower system error weight indicates a lower likelihood the system error will result in loss of operability, and wherein the at least one component comprises at least one of computer hardware and a software component executed in the system;

determining at least one manufacturing defect weight for the at least one component whose operation results in the system error, wherein the at least one manufacturing defect weight is updated from a manufacturer of the at least one component, and wherein the at least one manufacturing defect weight indicates a likelihood at least one manufacturing defect will result in inoperability of the at least one component;

processing the system error weight and the determined at least one manufacturing defect weight for the at least one component to determine a quality assessment value for the at least one component, wherein the quality assessment value indicates a likelihood of failure or continued degradation in performance of the at least one component;

determining whether a comparison of the quality assessment value and a threshold value indicates a negative assessment of the at least one component; and transmitting a message directed to an administrator of the system indicating the negative assessment of the component in response to determining that the quality assessment value and the threshold value indicate the negative assessment.

2. The computer program product of claim 1, wherein a manufacturing defect for a component whose operations results in at least two system errors is only considered once in the quality assessment value.

3. The computer program product of claim 1, wherein the determining whether there is a manufacturing defect weight of a component comprises:

determining a date of manufacture of the component; and determining whether the date of manufacture of the component is within a range of dates of a manufacturing defect, wherein the manufacturing defect weight is determined in response to determining that the date of manufacture of the component is within the range of dates.

4. The computer program product of claim 3, wherein the operations further comprise:

maintaining a component defect database indicating a component defect instance for each of a plurality of components, including a component identifier assigned by a manufacturer of the component, a defect detected for the component, and range of dates of manufacture during which the defect was detected, wherein the determining the range of dates and the defect are determined from the component defect instance for the component identifier deployed in the system.

5. The computer program product of claim 1, wherein the processing the system error weight for the system error and the at least one manufacturing defect weight comprises:

multiplying the number of instances of the system error by the system error weight for the system error;

multiplying a number of instances of the at least one component having the at least one manufacturing defect by the at least one manufacturing defect weight for the at least one manufacturing defect; and combining results of the multiplying the number of instances of the system error by the system error weight and the number of instances of the at least one component having the at least one manufacturing defect and the at least one manufacturing defect weight for the at least one manufacturing defect to produce the quality assessment value.

6. The computer program product of claim 1, wherein the operations further comprise:
   receiving, from over a network, a transmission from the system of the system error gathered in error logs in at least one of an operating system and device driver for the at least one component deployed in the system;
   maintaining a component defect database indicating component defect instances for a plurality of components, wherein a component defect instance, of the component defect instances, includes a component identifier provided by a manufacture of the component, manufacturing defect, a manufacturing defect weight for the defect, and a range of dates of manufacture during which a manufacturing defect was detected, wherein the determining a manufacturing defect weight comprises determining the manufacturing defect weight from the component defect instance for a component identifier of the component deployed in the system, wherein the component defect database includes component defect instances for a plurality of components from different manufacturers; and
   maintaining a system error database indicating a system error instance for each system error of a plurality of system errors, wherein the system error instance includes a system error code and system error weight, wherein the determining the system error weight comprises determining the system error weight from the system error instance for the system error indicated in the transmission.

7. The computer program product of claim 1, wherein the at least one component comprises a hardware component and the at least one manufacturing defect concerns a defect in a hardware sub-component of the hardware component, and wherein the system error relates to an error reported to an error log maintained by an operating system or device driver for a component executing in the system.

8. The computer program product of claim 1, wherein the computer program product is executed in the system, and wherein the operations further comprise:
   receiving from a server over a network information from a manufacturer of a component of a manufacturing defect related to the component.

9. A system for providing health status of components in a system, comprising:
   a processor; and
   a computer readable storage medium having computer readable program code embodied therein that is executable to perform operations, the operations comprising:
      receiving a system error message including a system error code for a system error and a number of instances of the system error;
      processing the system error code and the number of instances of the system error to determine a system error weight indicating a likelihood a system error will result in inoperability of at least one component deployed in the system, wherein the system error weight indicates one of a plurality of values, wherein a higher system error weight indicates a higher likelihood the system error will result in loss of operability and a lower system error weight indicates a lower likelihood the system error will result in loss of operability, and wherein the at least one component comprises at least one of computer hardware and a software component executed in the system;
      determining at least one manufacturing defect weight for the at least one component whose operation results in the system error, wherein the at least one manufacturing defect weight is updated from a manufacturer of the at least one component, and wherein the at least one manufacturing defect weight indicates a likelihood at least one manufacturing defect will result in inoperability of the at least one component;
      processing the system error weight and the determined at least one manufacturing defect weight for the at least one component to determine a quality assessment value for the at least one component, wherein the quality assessment value indicates a likelihood of failure or continued degradation in performance of the at least one component;
      determining whether a comparison of the quality assessment value and a threshold value indicates a negative assessment of the at least one component; and
      transmitting a message directed to an administrator of the system indicating the negative assessment of the component in response to determining that the quality assessment value and the threshold value indicate the negative assessment.

10. The system of claim 9, wherein a manufacturing defect for a component whose operations results in at least two system errors is only considered once in the quality assessment value.

11. The system of claim 9, wherein the determining whether there is a manufacturing defect weight of a component comprises:
    determining a date of manufacture of the component; and
    determining whether the date of manufacture of the component is within a range of dates of a manufacturing defect, wherein the manufacturing defect weight is determined in response to determining that the date of manufacture of the component is within the range of dates.

12. The system of claim 9, wherein the processing the system error weight for the system error and the at least one manufacturing defect weight comprises:
    multiplying the number of instances of the system error by the system error weight for the system error;
    multiplying a number of instances of the at least one component having the at least one manufacturing defect by the at least one manufacturing defect weight for the at least one manufacturing defect; and
    combining results of the multiplying the number of instances of the system error by the system error weight and the number of instances of the at least one component having the at least one manufacturing defect and the at least one manufacturing defect weight for the at least one manufacturing defect to produce the quality assessment value.

13. The system of claim 9, wherein the at least one component comprises a hardware component and the at least one manufacturing defect concerns a defect in a hardware sub-component of the hardware component, and wherein the system error relates to an error reported to an error log maintained by an operating system or device driver for a component executing in the system.

14. A method for providing health status of components in a system, comprising:
    receiving a system error message including a system error code for a system error and a number of instances of the system error;
    processing the system error code and the number of instances of the system error to determine a system error weight indicating a likelihood a system error will result in inoperability of at least one component deployed in the system, wherein the system error weight indicates one of a plurality of values, wherein a higher system error weight indicates a higher likelihood the system error will result in loss of operability and a lower system error weight indicates a lower likelihood the system error will result in loss of operability, and wherein the at least one component comprises at least one of computer hardware and a software component executed in the system;

determining at least one manufacturing defect weight for the at least one component whose operation results in the system error, wherein the at least one manufacturing defect weight is updated from a manufacturer of the at least one component, and wherein the at least one manufacturing defect weight indicates a likelihood at least one manufacturing defect will result in inoperability of the at least one component;

processing the system error weight and the determined at least one manufacturing defect weight for the at least one component to determine a quality assessment value for the at least one component, wherein the quality assessment value indicates a likelihood of failure or continued degradation in performance of the at least one component;

determining whether a comparison of the quality assessment value and a threshold value indicates a negative assessment of the at least one component; and transmitting a message directed to an administrator of the system indicating the negative assessment of the component in response to determining that the quality assessment value and the threshold value indicate the negative assessment.

15. The method of claim 14, wherein a manufacturing defect for a component whose operations results in at least two system errors is only considered once in the quality assessment value.

16. The method of claim 14, wherein the determining whether there is a manufacturing defect weight of a component comprises:

determining a date of manufacture of the component; and determining whether the date of manufacture of the component is within a range of dates of a manufacturing defect, wherein the manufacturing defect weight is determined in response to determining that the date of manufacture of the component is within the range of dates.

17. The method of claim 14, wherein the processing the system error weight for the system error and the at least one manufacturing defect weight comprises:

multiplying the number of instances of the system error by the system error weight for the system error;

multiplying a number of instances of the at least one component having the at least one manufacturing defect by the at least one manufacturing defect weight for the at least one manufacturing defect; and combining results of the multiplying the number of instances of the system error by the system error weight and the number of instances of the at least one component having the at least one manufacturing defect and the at least one manufacturing defect weight for the at least one manufacturing defect to produce the quality assessment value.

18. The method of claim 14, wherein the at least one component comprises a hardware component and the at least one manufacturing defect concerns a defect in a hardware sub-component of the hardware component, and wherein the system error relates an error reported to an error log maintained by an operating system or device driver for a component executing in the system.

* * * * *